United States Patent
Kaneko et al.

(10) Patent No.: US 12,419,287 B2
(45) Date of Patent: Sep. 23, 2025

(54) REEL SEAT AND FISHING ROD

(71) Applicant: GLOBERIDE, Inc., Higashikurume (JP)

(72) Inventors: Kyoichi Kaneko, Higashikurume (JP); Yoshinao Kato, Higashikurume (JP); Masaru Akiba, Higashikurume (JP)

(73) Assignee: GLOBERIDE, Inc., Tokyo (JP)

( * ) Notice: Subject to any disclaimer, the term of this patent is extended or adjusted under 35 U.S.C. 154(b) by 0 days.

(21) Appl. No.: 18/726,230

(22) PCT Filed: Dec. 15, 2022

(86) PCT No.: PCT/JP2022/046120
§ 371 (c)(1),
(2) Date: Jul. 2, 2024

(87) PCT Pub. No.: WO2023/210053
PCT Pub. Date: Nov. 2, 2023

(65) Prior Publication Data
US 2025/0064038 A1 Feb. 27, 2025

(30) Foreign Application Priority Data
Apr. 28, 2022 (JP) ................. 2022-074535

(51) Int. Cl.
*A01K 87/06* (2006.01)
*A01K 87/08* (2006.01)

(52) U.S. Cl.
CPC .............. *A01K 87/06* (2013.01); *A01K 87/08* (2013.01)

(58) Field of Classification Search
CPC ................................ A01K 87/06; A01K 87/08
See application file for complete search history.

(56) References Cited

U.S. PATENT DOCUMENTS 4,648,195 A * 3/1987 Kim ................. A01K 87/06
43/22
11,206,820 B2 * 12/2021 Iwata ................. A01K 87/06
(Continued)

FOREIGN PATENT DOCUMENTS

GB 2462898 A * 3/2010 ............. A01K 87/06
JP S49-122082 U 10/1974
(Continued)

OTHER PUBLICATIONS

Feb. 14, 2023 Search Report issued in International Patent Application No. PCT/JP2022/046120.
(Continued)

*Primary Examiner* — Christopher P Ellis
(74) *Attorney, Agent, or Firm* — Oliff PLC

(57) ABSTRACT

A reel seat attaches to a rod body and includes a main body including a reel leg placing portion with a reel leg, a fixed hood, tubular portion and movable hood on the reel leg placing portion; and a nut member on the tubular portion rotates the movable hood, wherein the tubular portion includes cylindrical and recessed portions partially cut out, the movable hood includes an engaging portion inside the tubular portion and a hood portion accommodating at least a part of the reel leg, the nut member is on an outer surface of the recessed portion to be relatively rotatable and an inner surface of the nut member is engaged with the engaging portion so the movable hood moves to the rear side in the axial direction by rotation of the nut member, and the rod body is insertable into the cylindrical portion of the tubular portion.

10 Claims, 6 Drawing Sheets

(56) References Cited

U.S. PATENT DOCUMENTS

| | | |
|---|---|---|
| 2019/0166815 A1 | 6/2019 | Malcarne |
| 2023/0263146 A1 | 8/2023 | Kaneko et al. |
| 2023/0276778 A1* | 9/2023 | Teshirogi ............... A01K 87/06 |
| 2024/0023530 A1 | 1/2024 | Kaneko et al. |

FOREIGN PATENT DOCUMENTS

| | | | |
|---|---|---|---|
| JP | S49-046557 Y2 | 12/1974 | |
| JP | S50-024539 Y2 | 7/1975 | |
| JP | S61-002056 U | 1/1986 | |
| JP | 2001-321033 A | 11/2001 | |
| JP | 2001-333667 A | 12/2001 | |
| JP | 2013-121342 A | 6/2013 | |
| JP | 2020-089310 A | 6/2020 | |
| JP | 2022-039168 A | 3/2022 | |
| JP | 2022-055420 A | 4/2022 | |
| KR | 20090105790 A * | 10/2009 | |
| WO | WO-2018034329 A1 * | 2/2018 | ............. A01K 87/06 |
| WO | WO-2022044787 A1 * | 3/2022 | ............. A01K 87/06 |

OTHER PUBLICATIONS

Oct. 29, 2024 International Preliminary Report on Patentability issued in International Patent Application No. PCT/JP2022/046120.

Jul. 15, 2025 Office Action issued in Japanese Application No. 2022-074535.

* cited by examiner

REEL SEAT AND FISHING ROD

CROSS REFERENCE

The present application claims priority based on Japanese Patent Application No. 2022-074535 (filed on Apr. 28, 2022), the contents of which are incorporated herein by reference in their entirety.

The present invention relates to a reel seat and a fishing rod comprising the same.

TECHNICAL FIELD

Background Art

Conventionally, various fishing rods comprising a fishing rod reel seat have been known.

In such fishing rod, a fishing rod reel seat and a fishing rod grip are usually placed on a rod body, and a reel leg placing portion for placing a reel leg on an upper side or a lower side of a main body is formed on the fishing rod reel seat.

As the reel seat for such fishing rod, for example, as disclosed in Patent Literatures 1 to 3, a reel seat (also referred to as an offset reel seat) in which a position of a reel leg placing portion of the reel seat is offset in a direction of falling down with respect to an axial center of a base rod is known. According to such offset reel seat, it is disclosed that, since the reel leg placing portion is shifted downward, when a round double-bearing reel is attached, even when a grip portion on a rear side thereof is gripped, an operation position of the thumb does not become high, and it is possible to suppress deterioration in operability due to opening of the palm.

CITATION LIST

Patent Literature

Patent Literature 1: JP 49-122082 U
Patent Literature 2: JP 49-46557 Y
Patent Literature 3: JP 50-24539 Y

SUMMARY OF INVENTION

Technical Problem

However, an offset reel seat made of a metal material to be thick has no problem in terms of strength, but has a problem that a weight of the reel seat becomes too large. In the reel seat according to these patent literatures, even with a double-bearing reel in which a clutch lever that brings a spool into a free rotation state at the time of casting operation is disposed so as to project from a surface of a side plate, a clutch operation can be easily performed; however, due to the structure in which the position of the reel leg placing portion of the reel seat is offset in a direction of falling down with respect to the axial center of the base rod, strength of the reel seat in a region of the reel seat leg placing portion is significantly deteriorated, and stress is concentrated in these regions, so that break and destruction easily occur depending on a use mode, and there is a problem of having an essential problem in durability.

The present invention is achieved in view of the above-described circumstances, and an object is to provide a reel seat capable of supporting both round and low profile double-bearing reels, less likely to be deteriorated in strength, and can significantly improve durability even in a case where a structure in which a position of a reel leg placing portion of a reel seat is offset in a direction of falling down with respect to an axial center of a base rod is adopted, and a fishing rod comprising the same. Other objects of the present invention will become apparent by referring to the entire present specification.

Solution to Problem

A reel seat according to one embodiment of the present invention is a reel seat attached to a rod body, the reel seat comprising a reel seat main body comprising a reel leg placing portion on which a reel leg is placed, a fixed hood provided on a rear side in an axial direction of the reel leg placing portion, and a tubular portion partially cut out provided on a front side in the axial direction of the reel leg placing portion; a movable hood comprising an engaging portion provided in the tubular portion and a hood portion accommodating at least a part of the reel leg; and a nut member provided on an outer surface of the tubular portion enabling movement of the movable hood by rotation, in which the tubular portion comprises a cylindrical portion and a recessed portion partially cut out, the movable hood comprises an engaging portion provided on an inner surface of the tubular portion and a hood portion accommodating at least a part of the reel leg, the nut member is provided on an outer surface of the recessed portion so as to be relatively rotatable and an inner surface of the nut member is engaged with the engaging portion in such a manner that the movable hood can be moved to the rear side in the axial direction by rotation of the nut member, and the rod body is insertable into the cylindrical portion of the tubular portion.

In the reel seat according to one embodiment of the present invention, the engaging portion and the nut member are screwed with each other.

In the reel seat according to one embodiment of the present invention, the rod body is inserted or insertable into the cylindrical portion in a range from 5 mm to 20 mm as seen in an axial direction of the cylindrical portion.

In the reel seat according to one embodiment of the present invention, in a state in which the rod body is inserted, the rod body, the engaging portion, and the reel seat main body are provided in order from an inner side as seen in a downward direction from a central axis of the tubular portion in a cross section perpendicular to an axial direction of the tubular portion.

In the reel seat according to one embodiment of the present invention, the engaging portion is formed into an arc shape as seen in the cross section perpendicular to the axial direction of the tubular portion.

In the reel seat according to one embodiment of the present invention, an angle of an arc of the arc shape ranges from 70 degrees to 90 degrees.

In the reel seat according to one embodiment of the present invention, the engaging portion and the hood portion are offset from each other as seen in a radial direction of a central axis of the reel seat.

In the reel seat according to one embodiment of the present invention, in a case where the engaging portion and the hood portion are offset, a connection part extending perpendicularly to the central axis of the reel seat and connecting the engaging portion and the hood portion is included between the engaging portion and the hood portion.

In the reel seat according to one embodiment of the present invention, the engaging portion of the movable hood can move a cutout portion of the recessed portion of the tubular portion in an axial direction of the reel seat.

A fishing rod according to one embodiment of the present invention comprises the reel seat according to any one of above-description; and a rod body.

Advantageous Effects of Invention

According to the above-described embodiment, even in a case where a structure in which a position of a reel leg placing portion of a reel seat is offset in a direction of falling down with respect to an axial center of a base rod is adopted, it is possible to provide a reel seat capable of supporting both round and low profile double-bearing reels, less likely to be deteriorated in strength, and can significantly improve durability, and a fishing rod comprising the same.

DESCRIPTION OF EMBODIMENTS

Hereinafter, an embodiment of a reel seat and a fishing rod according to the present invention will be specifically described with reference to the accompanying drawings. Components that are common in a plurality of drawings are denoted by the same reference signs throughout the plurality of drawings. It should be noted that each drawing is not necessarily drawn to an accurate scale for convenience of description.

Figure 1:
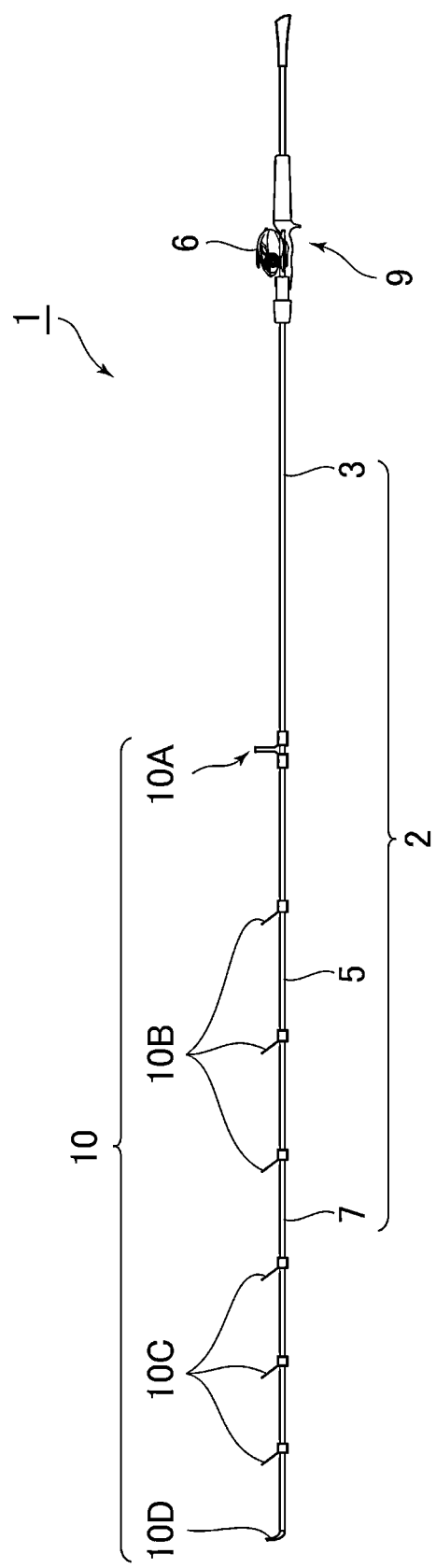
FIG. 1 is a diagram illustrating a fishing rod according to one embodiment of the present invention.

FIG. 1 is a diagram illustrating one embodiment of a fishing rod according to the present invention. As illustrated in the drawing, a fishing rod 1 according to one embodiment of the present invention comprises a rod body 2, a reel 6 attached to the rod body 2 via a reel seat 9, and a fishing line guide 10 attached to the rod body 2. In the illustrated embodiment, each of the reel seat 9 and the fishing line guide 10 corresponds to attachment components attached to an outer peripheral surface of the rod body.

The rod body 2 is formed, for example, by connecting a base rod 3, a middle rod 5, a tip rod 7 and the like to each other. These rod bodies are jointed to each other, for example, as an ordinarily jointed type. The base rod 3, the middle rod 5, and the tip rod 7 can be jointed to each other as a telescopic type, an inversely jointed type, a socket-and-spigot jointed type, or any other known jointed type. The rod body 2 may be formed of a single rod body.

Each of the base rod 3, the middle rod 5, and the tip rod 7 is formed of, for example, a tubular body made of a fiber-reinforced resin. This tubular body made of a fiber-reinforced resin is created by winding a fiber-reinforced resin prepreg (prepreg sheet) obtained by impregnating reinforcing fibers with a matrix resin around a core metal, and heating and curing the prepreg sheet. As the reinforcing fibers contained in the prepreg sheet, for example, carbon fibers, glass fibers, and any other known reinforcing fibers can be used. As the matrix resin contained in the prepreg sheet, a thermosetting resin such as an epoxy resin can be used. After the prepreg sheet is cured, the core metal is removed. An outer surface of the tubular body is appropriately polished. Each of the rod bodies may be formed into a solid shape.

In the illustrated embodiment, the base rod 3, the middle rod 5, and the tip rod 7 are provided with a plurality of fishing line guides 10 (fishing line guides 10A to 10D) for guiding a fishing line fed from the reel 6 attached to the reel seat 9. More specifically, the base rod 3 is provided with the fishing line guide 10A, the middle rod 5 is provided with the fishing line guide 10B, and the tip rod 7 is provided with the fishing line guide 10C. A top guide 10D is provided on a distal end of the tip rod 7, but this is not described in detail.

Next, a basic configuration of a reel seat main body 12 and the reel seat 9 will be described with reference to FIG. 2. In the following description, an axial direction (front-rear direction) and an up-down direction mean directions illustrated in FIG. 2, and a right-left direction (side direction) mean a direction orthogonal to a sheet surface of FIG. 2. That is, a front side and a rear side means a tip rod side and a proximal end side of the fishing rod, respectively, an upper side means a reel side with respect to an axial center X of a base rod (rod) when a double-bearing reel is attached, and a lower side means an opposite side of the reel side.

The reel seat main body 12 comprises the reel seat main body 12 comprising a reel leg placing surface 12a on which a reel leg 6a of the fishing reel 6 is placed in an axial direction thereof. The reel seat main body 12 can be formed to have a length ranging from 150 mm to 200 mm, for example, but is not limited thereto. The reel seat main body 12 forms a bulging portion (trigger) 12b that is a slightly bulged portion from an opposite side of the reel leg placing surface 12a having an easy-to-grip curved outer surface that supports a thenar or an area near the thenar when gripped with a gripping hand. Note that, the rod body may be jointed on a rear side of the reel seat main body 12.

Figure 2:
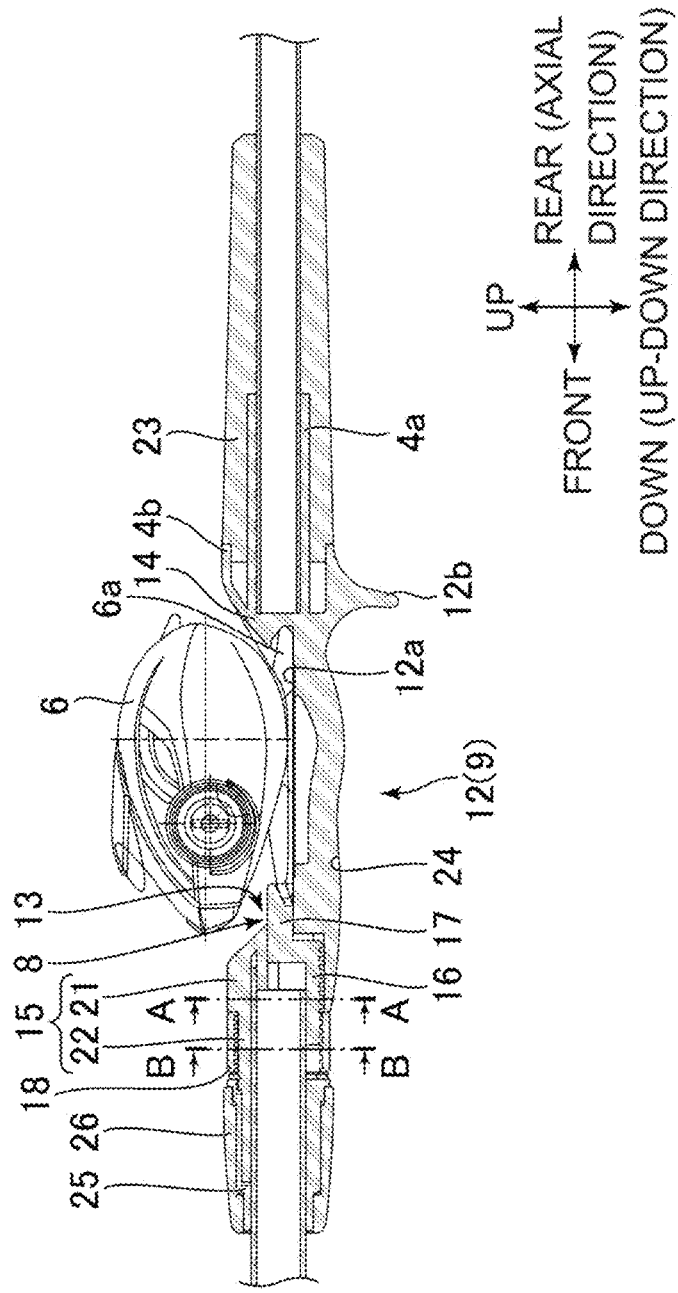
FIG. 2 is a diagram illustrating a reel seat according to one embodiment of the present invention.

The reel leg placing surface 12a of the reel seat main body 12 can be formed flat or substantially flat with a larger curvature than that of other sites in a circumferential direction (for example, the trigger 12b) adjacent to the reel leg placing surface 12a of the reel seat main body 12, and is formed to extend in the axial direction of the reel seat main body 12 illustrated in FIG. 2. A fixed hood 14 is integrally disposed on one end (rod base side) of the reel seat main body 12. One end of the reel leg placing surface 12a of the reel seat main body 12 is disposed inside the fixed hood 14.

As will be described later in detail, a movable hood 13 is attached to the other end (rod tip side) of the reel seat main body 12 so as to be movable in the axial direction. A fishing reel 200 is attached and fixed to the reel seat 9 by placing the reel leg 6a on the reel leg placing portion 12a and fastening a front end side thereof by the movable hood 13 moving in the axial direction in a state in which a rear end side thereof is fitted in the fixed hood 14. Note that, the reel seat 9 comprises the reel seat main body 12 and the movable hood 13, but may comprise other members.

The reel seat according to one embodiment of the present invention will be described in more detail with reference to FIG. 2 again. As illustrated in the drawing, the reel seat 9 according to one embodiment of the present invention is the reel seat 9 attached to the rod body 2, the reel seat 9 comprising the reel seat main body 12 comprising the reel leg placing portion 12a on which the reel leg 6a is placed, the fixed hood 14 provided on a rear side in the axial direction of the reel leg placing portion 12a (rod butt side), and a tubular portion 15 partially cut out provided on a front side in the axial direction of the reel leg placing portion 12a (rod tip side); the movable hood 13 provided on the front side in the axial direction of the reel leg placing portion 12a; and a nut member 18 provided on an outer surface of the tubular portion 15 enabling movement of the movable hood 13 by rotation, in which the tubular portion 15 comprises a cylindrical portion 21 and a recessed portion 22 partially cut out, the movable hood 13 comprises an engaging portion 16 provided on an inner surface of the tubular portion 15, and a hood portion 17 accommodating at least a part of the reel leg 6a, the nut member 18 is provided on an outer surface of the recessed portion 22 so as to be relatively rotatable with respect to the recessed portion 22, an inner surface 18a of the nut member 18 is engaged with the engaging portion 16 so that the movable hood 13 can be moved to the rear side in the axial direction (rod butt side) by the rotation of the nut member 18, and the rod body 2 is formed to be insertable into the cylindrical portion 21 of the tubular portion 15. Note that, a projection can be provided on an end of the rod body 2. In this manner, it is possible to adopt a structure for preventing rotation by a shape of a base side end face portion of the rod body 2. A spacer may be used in place of the rod body 2. In this case, for example, the rod body may be connected to the spacer by ordinary joint, or the rod body may be connected to the spacer by socket-and-spigot joint. Note that, although it has been described that the tubular portion 15 comprises the cylindrical portion 21 and the recessed portion 22 partially cut out, this may be provided in such a manner that the recessed portion 22 extends inside the cylindrical portion 21 at least partially (that is, in the tubular portion 15, the cylindrical portion 21 is provided on an outer side and the recessed portion 22 is provided on at least a part of an inner side).

According to the reel seat according to one embodiment of the present invention, even in a case where a structure in which a position of the reel leg placing portion of the reel seat is offset in a direction of falling down with respect to the axial center of the base rod is adopted, it is possible to provide the reel seat capable of supporting both round and low profile double-bearing reels, less likely to be deteriorated in strength, and can significantly improve durability. More specifically, the rod body itself can be inserted up to a portion in which the reel seat main body has a thick structure, a structure in which the engaging portion 16 of the movable hood 13 grips a rear portion of the rod body is adopted, and it is possible to implement a reel seat structure that is lightweight, can support a low profile double-bearing reel, and has sufficient strength.

Figure 3:
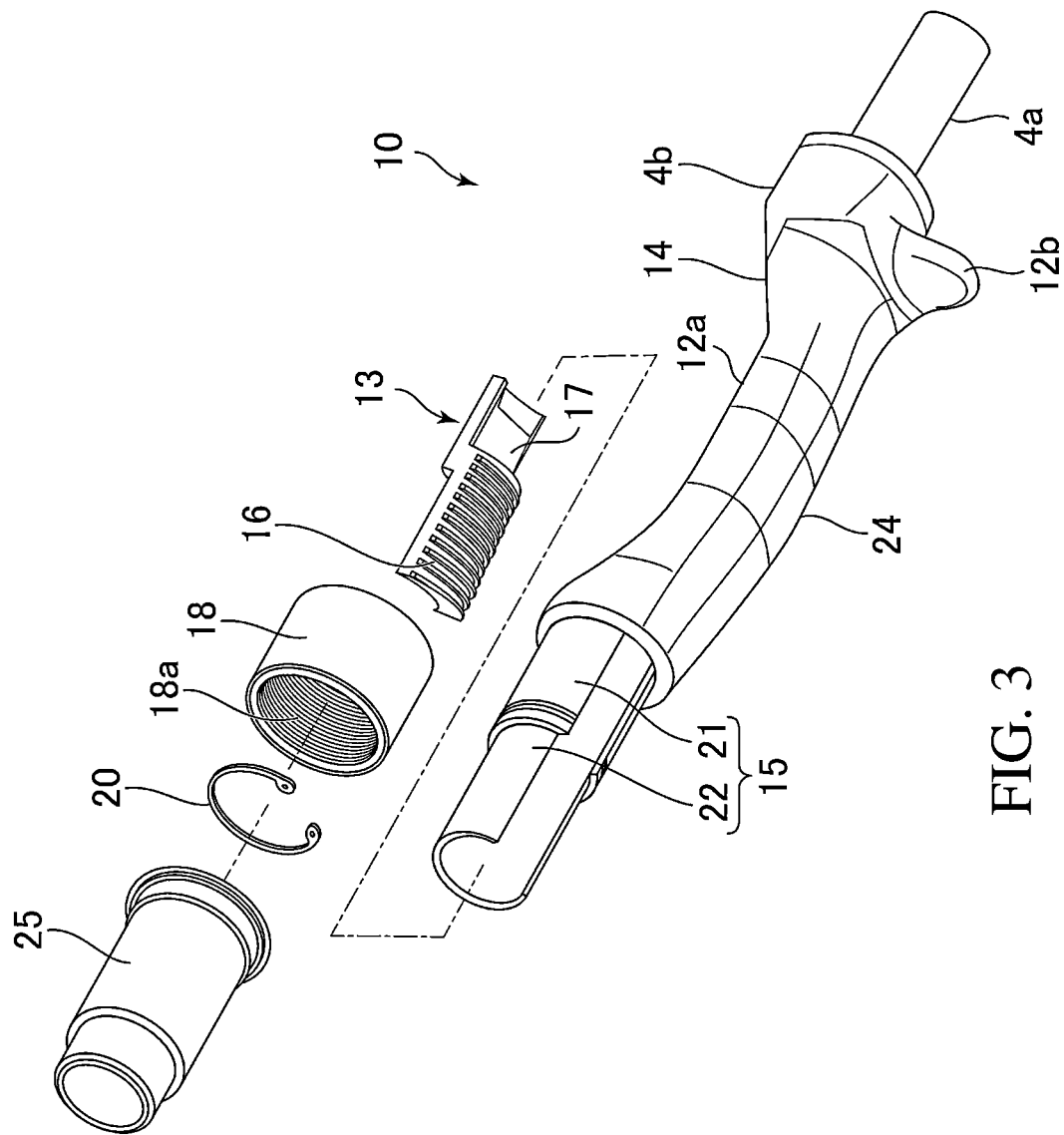
FIG. 3 is a perspective view of the reel seat according to one embodiment of the present invention.

Next, the reel seat according to one embodiment of the present invention will be further described with reference to FIGS. 2 and 3. The reel seat main body 12 of the reel seat 9 comprises the tubular portion 15 on a front side, and a grip portion (rear grip) 23 gripped and held is fixed to a rear side. The reel seat main body 12 comprises an intermediate coupling portion 24 that connects the tubular portion 15 and a rear tubular portion 4b in the axial direction, and they are integrally formed. A proximal end side outer peripheral surface of the rod body 2 forming the fishing rod is fixed to the inner surface of the tubular portion 15 by adhesion or the like, and the grip portion 23 is fixed to an outer peripheral surface of a tubular projection 4a formed to project in the axial direction on the rear side of the reel seat main body 12, and is formed to be flush with a surface of the rear tubular portion 4b. In this case, the rear tubular portion 4b is also a portion gripped and held together with the grip portion 23, and may form a grip. Note that, the configuration of the fishing rod 1 to which the reel seat 9 is fixed is not limited and may be a telescopic type, a jointed type, a single body type and the like, and in FIG. 2, a part of the fishing rod (a part of the rod body) is illustrated, and an entire configuration is omitted. An example in which, a double-bearing reel (hereinafter, also referred to as a reel) of a low profile type is attached and fixed as the fishing reel 6 to the reel seat 9 is illustrated.

The movable hood 13 comprises the engaging portion 16 in which a male screw portion is formed, and the hood portion 17 curved radially inward to accommodate at least a part of the reel leg 6a. The hood portion 17 is disposed so as to enter an opening 8 formed below a front end face of the intermediate coupling portion 24 (an end face of the tubular portion 15), and the opening 8 is connected to the reel leg placing portion 12a. That is, when the movable hood 13 moves rearward, the hood portion 17 thereof is fitted in a front end of the reel leg 6a placed on the reel leg placing portion 12a in the opening 8.

The male screw portion of the engaging portion 16 of the movable hood 13 is screwed with a female screw portion formed on the inner surface 18a of the nut member 18 externally fitted to the tubular portion 15 (or the recessed portion 22 of the tubular portion 15). That is, when the nut member 18 is rotationally operated in one direction, the movable hood 13 moves to the rear side in the axial direction to fasten the front end side of the reel leg 6a (attached and fixed state of the reel), and when the nut member 18 is rotationally operated in the other direction, the movable hood 13 moves to the front side in the axial direction to release the front end side of the reel leg 6a (detached state of the reel). Here, various conventionally known methods are possible as a method of engaging the engaging portion 16 with the inner surface of the nut member 18, and the method is not limited to a specific mode (screwing). Note that, a circumferential groove is formed in a circumferential direction on the front end side of the tubular portion 15, and by attaching a ring-shaped member (stop ring) 20 to this portion, it is possible to restrict the nut member 18 from coming off to the front side.

On an outer surface of the reel seat main body 12, a grip support portion 25 is adhered adjacent to the nut member 18, and a grip portion (front grip) 26 is fixed on the grip support portion 25 to be flush with a surface of the nut member 18 operated to be rotated; however, a configuration without the grip portion 26 provided is also possible.

In the reel seat 9 according to one embodiment of the present invention, the engaging portion 16 and the nut member 18 are screwed with each other.

In the reel seat 9 according to one embodiment of the present invention, the rod body 2 is configured to be inserted or insertable into the cylindrical portion within a range from 5 mm to 20 mm as seen in the axial direction of the cylindrical portion.

Figure 5:
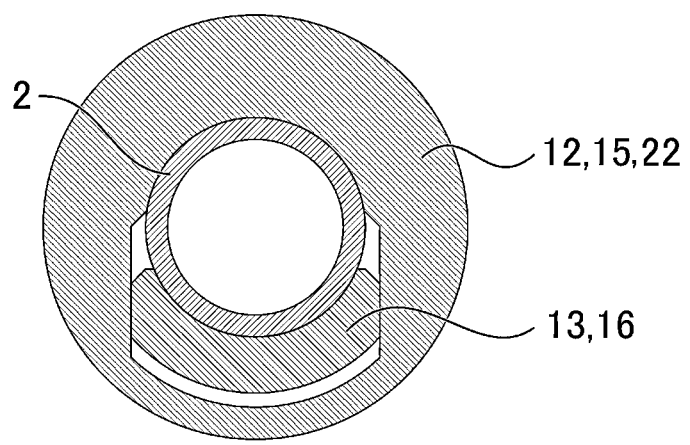
FIG. 5 is a cross-sectional view of the reel seat according to one embodiment of the present invention.

Next, a cross-sectional structure of the reel seat 9 according to one embodiment of the present invention will be described with reference to FIG. 5. FIG. 5 illustrates an A-A cross section of FIG. 2. As illustrated in the drawing, in the reel seat 9 according to one embodiment of the present invention, in a state in which the rod body 2 is inserted (and in a case where the movable hood 13 is in the position of FIG. 2), when a cross section perpendicular to the axial direction of the tubular portion 15 is seen in a downward direction from the central axis of the tubular portion 15 (downward direction in the up-down direction of the sheet surface of FIG. 5), the rod body 2, the movable hood (the engaging portion 16), and the reel seat main body 12 (the tubular portion 15 or the cylindrical portion 21) are provided in this order from the inner side. As illustrated in the drawing, the cylindrical portion 21 of the tubular portion 15 of the reel seat main body 12 has a circular or substantially circular outer surface, and an inner surface forms a space capable of accommodating the cylindrical rod body 2 and the engaging portion 16 formed by curving. Various shapes of the inner side of the cylindrical portion 21 are possible depending on a dimension of the rod body and a shape of the engaging portion 16, and are not limited to a specific mode.

In this manner, in the reel seat 9 according to one embodiment of the present invention, since the rod body 2 can be inserted into a thicker portion (the cylindrical portion 21 of the tubular portion 15 is thicker than the recessed portion 22) of the reel seat main body of the reel seat main body 12, even in a case where the structure in which the position of the reel leg placing portion of the reel seat is offset in the direction of falling down with respect to the axial center of the base rod is adopted, it is possible to provide the reel seat capable of supporting both the round and low profile double-bearing reels, less likely to be deteriorated in strength, and can significantly improve durability.

Figure 4:
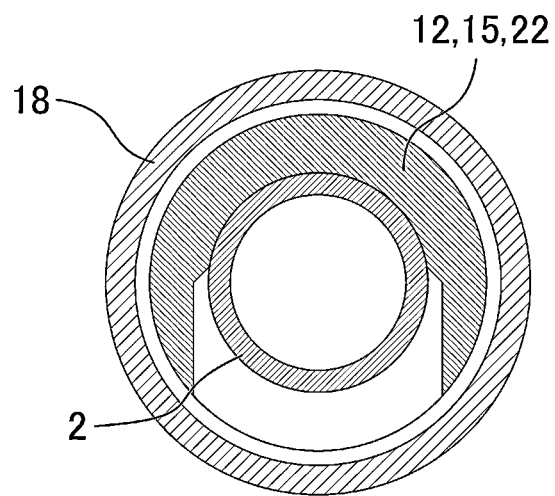
FIG. 4 is a cross-sectional view of the reel seat according to one embodiment of the present invention.

Next, a cross-sectional structure of the reel seat 9 according to one embodiment of the present invention will be described with reference to FIG. 4. FIG. 4 illustrates a B-B cross section of FIG. 2. As illustrated in the drawing, in the reel seat 9 according to one embodiment of the present invention, in a state in which the rod body 2 is inserted (and in a case where the movable hood 13 is in the position of FIG. 2), the rod body 2, the reel seat main body 12 (the tubular portion 15 or the recessed portion 22), and the nut member 18 are provided in this order from the inner side when the cross section perpendicular to the axial direction of the tubular portion 15 is seen in an upward direction from the central axis of the tubular portion 15 (the upward direction in the up-down direction of the sheet surface of FIG. 4), and the rod body 2 and the nut member 18 are provided in this order from the inner side when the cross section perpendicular to the axial direction of the tubular portion 15 is seen in a downward direction from the central axis of the tubular portion 15 (downward direction in the up-down direction of the sheet surface of FIG. 4), and a space through which the movable hood 13 passes is formed between the rod body 2 and the nut member 18. In this manner, the engaging portion 16 of the movable hood 13 can move the cutout portion of the recessed portion 22 of the tubular portion 15 back and forth in the axial direction of the reel seat 9. Here, as illustrated in FIG. 4, the recessed portion 22 is formed into a recessed shape having an opening in the downward direction, thereby reducing a weight of the tubular portion 15 of the reel seat main body 12. In this manner, the tubular portion 15 comprises the cylindrical portion 21 and the recessed portion 22, and does not form a complete tubular shape, but can be said to be the tubular portion 15 partially cut out (the same applies throughout the present specification).

Figure 6A:
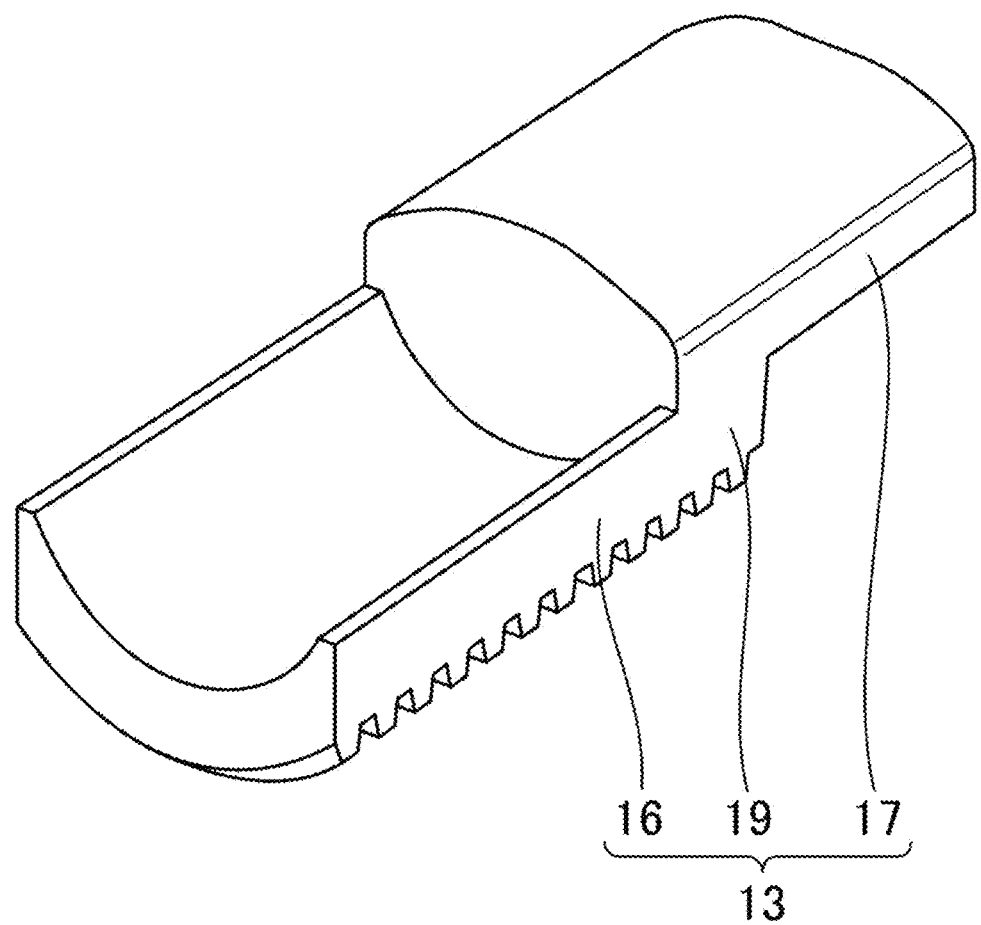
FIG. 6A is an upward perspective view of a movable hood in the reel seat according to one embodiment of the present invention.
Figure 6B:
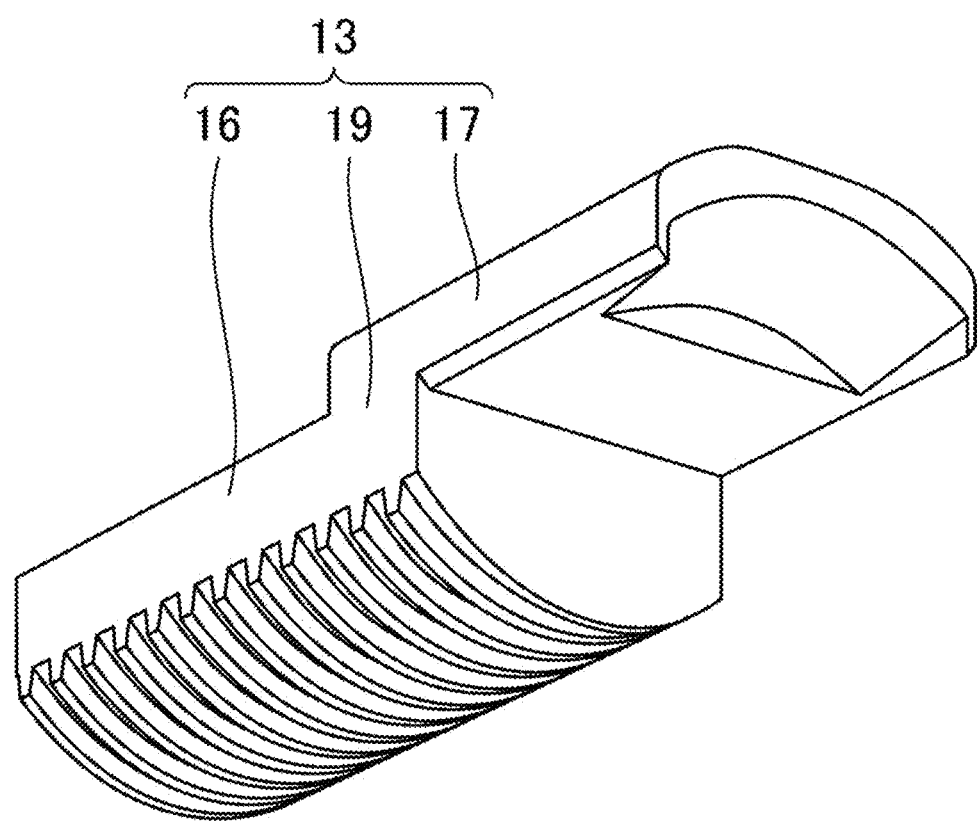
FIG. 6B is a downward perspective view of the movable hood in the reel seat according to one embodiment of the present invention.

Next, with reference to FIG. 6, a structure of the movable hood 13 in the reel seat 9 according to one embodiment of the present invention will be described. FIGS. 6A and 6B are perspective views (the former is seen from obliquely above, and the latter is seen from obliquely below). As illustrated in the drawing, the movable hood 13 comprises the engaging portion 16 and the hood portion 17, and the engaging portion 16 is formed into an arc shape or a curved shape as seen in the cross section (cross section illustrated in FIG. 4) perpendicular to the axial direction of the tubular portion 15. In this manner, the inner surface is in close contact with and securely adhered to the surface of the rod body 2, and the male screw portion provided on the outer surface can be screwed with the female screw portion formed on the inner surface 18a of the nut member 18. The engaging portion 16 of the movable hood 13 is formed into an arc shape having an angle ranging from 70 degrees to 90 degrees.

As illustrated in FIG. 6, in the movable hood 13 in the reel seat according to one embodiment of the present invention, the engaging portion 16 and the hood portion 17 are offset from each other as seen in a radial direction of the central axis of the reel seat 9 (the hood portion 17 is formed inside the engaging portion 16 as seen in the radial direction of the central axis of the reel seat 9). In a case where the engaging portion 16 and the hood portion 17 are offset, a connection part 19 extending perpendicularly to the central axis of the reel seat 9 and connecting the engaging portion 16 and the hood portion 17 is included between the engaging portion 16 and the hood portion 17. By adjusting a length of the connection part 19 in this manner, the rod body itself can be inserted up to a portion where the reel seat main body has a thick structure.

The fishing rod 1 according to one embodiment of the present invention comprises the reel seat 9 and the rod body 2 described above.

According to fishing rod comprising the reel seat according to one embodiment of the present invention, even in a case where the structure in which the position of the reel leg placing portion of the reel seat is offset in the direction of falling down with respect to the axial center of the base rod is adopted, it is possible to provide the fishing rod comprising the reel seat capable of supporting both the round and low profile double-bearing reels, less likely to be deteriorated in strength, and can significantly improve durability. More specifically, since the structure in which the rod body itself can be inserted up to the portion where the reel seat main body has the thick structure can be adopted, stress concentration on a low strength portion is prevented, so that an offset reel seat structure having sufficient strength can be achieved.

Here, in the reel seat 9 according to one embodiment of the present invention, the reel seat main body 12 can be formed of carbon fiber reinforced plastic (CFRP), glass reinforced plastic (GFRP), Al, or Mg. The reel seat 12 may be formed of a material such as GFRTP (continuous fiber), GFRTP (discontinuous fiber) CFRTP (continuous fiber), CFRTP (discontinuous fiber) or a hybrid. By forming of such a material, it is possible to suppress an increase in weight while ensuring sufficient rigidity and strength.

Dimensions, materials, and arrangement of the components described in the present specification are not limited to those explicitly described in the embodiments, and these components may be modified to have optional dimensions, materials, and arrangement that might fall within the scope of the present invention. Components not explicitly described in the present specification can also be added to the described embodiment, or some of the components described in each embodiment can be omitted.

REFERENCE SIGNS LIST

1 Fishing rod
2 Rod body
3 Base rod
4a Tubular projection

4b Rear tubular portion
5 Middle rod
6 Reel
6a Reel leg
7 Tip rod
8 Opening
9 Reel seat
10 Fishing line guide
12 Reel seat main body
12a Reel leg placing surface
13 Movable hood
14 Fixed hood
15 Tubular portion
16 Engaging portion
17 Hood portion
18 Nut member
18a Inner surface of nut member
19 Connection part
20 Ring-shaped member
21 Cylindrical portion
22 Recessed portion
23 Grip portion (rear grip)
24 Intermediate coupling portion
25 Grip support portion
26 Grip portion (front grip)

The invention claimed is:

1. A reel seat configured to be attached to a rod body, the reel seat comprising:
a reel seat main body comprising a reel leg placing portion on which a reel leg is placed;
a fixed hood on a rear side in an axial direction of the reel leg placing portion;
a tubular portion partially cut out and on a front side in the axial direction of the reel leg placing portion;
a movable hood on a front side in the axial direction of the reel leg placing portion; and
a nut member on an outer surface of the tubular portion and enabling movement of the movable hood by rotation, wherein
the tubular portion comprises a cylindrical portion and a recessed portion partially cut out,
the movable hood comprises an engaging portion on an inner surface of the tubular portion and a hood portion accommodating at least a part of the reel leg,
the nut member is on an outer surface of the recessed portion so as to be relatively rotatable and an inner surface of the nut member is engaged with the engaging portion in such a manner that the movable hood can be moved to the rear side in the axial direction by rotation of the nut member,
the rod body is insertable into the cylindrical portion of the tubular portion,
the engagement portion is configured to be in contact with the rod body at an inner surface of the engagement portion, and
the hood portion is configured to enter an opening formed at an end face of the tubular portion and to be fitted onto a front end of the reel leg placed on the reel leg placing portion.

2. The reel seat according to claim 1, wherein the engaging portion and the nut member are screwed with each other.

3. The reel seat according to claim 1, wherein the rod body is inserted into the cylindrical portion in a range from 5 mm to 20 mm as seen in an axial direction of the cylindrical portion.

4. The reel seat according to claim 1, wherein, in a state in which the rod body is inserted, the rod body, the engaging portion, and the reel seat main body are in order the recited order from a central axis of the tubular portion in a cross section perpendicular to an axial direction of the tubular portion.

5. The reel seat according to claim 4, wherein the engaging portion comprises an arc shape as seen in the cross section perpendicular to the axial direction of the tubular portion.

6. The reel seat according to claim 5, wherein an angle of an arc of the arc shape ranges from 70 degrees to 90 degrees.

7. The reel seat according to claim 1, wherein the engaging portion and the hood portion are offset from each other as seen in a radial direction of a central axis of the reel seat.

8. The reel seat according to claim 7, wherein a connection part extending perpendicularly to the central axis of the reel seat and connecting the engaging portion and the hood portion is between the engaging portion and the hood portion.

9. The reel seat according to claim 1, wherein the engaging portion of the movable hood can move a cutout portion of the recessed portion of the tubular portion in an axial direction of the reel seat.

10. A fishing rod comprising: the reel seat according to claim 1; and the rod body.

* * * * *